(12) United States Patent
Wilson et al.

(10) Patent No.: US 9,783,341 B1
(45) Date of Patent: *Oct. 10, 2017

(54) DUNNAGE BAG HANGER APPARATUS AND METHOD

(71) Applicants: John R. Wilson, Sauk Rapids, MN (US); William M. Wilson, Rice, MN (US)

(72) Inventors: John R. Wilson, Sauk Rapids, MN (US); William M. Wilson, Rice, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/376,130

(22) Filed: Dec. 12, 2016

Related U.S. Application Data

(62) Division of application No. 14/918,480, filed on Oct. 20, 2015, now Pat. No. 9,545,872, which is a division of application No. 14/534,164, filed on Nov. 5, 2014, now Pat. No. 9,193,293.

(60) Provisional application No. 61/900,396, filed on Nov. 5, 2013.

(51) Int. Cl.
| | |
|---|---|
| *B60P 7/08* | (2006.01) |
| *B65D 33/14* | (2006.01) |
| *B60P 7/06* | (2006.01) |
| *B60P 7/135* | (2006.01) |

(52) U.S. Cl.
CPC .............. *B65D 33/14* (2013.01); *B60P 7/065* (2013.01); *B60P 7/135* (2013.01)

(58) Field of Classification Search
CPC ........... B60P 7/065; B60P 7/135; B65D 33/14

USPC .......... 410/87, 119, 125, 154, 155; 206/522, 206/593; 15/116.2, 119.2, 244.1; 428/35.2

See application file for complete search history.

(56) References Cited

U.S. PATENT DOCUMENTS

| | | | | |
|---|---|---|---|---|
| 5,431,515 A | * | 7/1995 | Sansone | B60P 7/12 410/125 |
| 5,487,202 A | * | 1/1996 | Cowan | A47L 13/254 15/147.1 |
| 5,502,862 A | * | 4/1996 | Vosbikian | A46B 5/0095 15/145 |
| 6,220,800 B1 | * | 4/2001 | Elze | B60P 3/20 410/117 |
| 9,193,293 B2 | * | 11/2015 | Wilson | B60P 7/065 410/119 |
| 9,545,872 B1 | * | 1/2017 | Wilson | B60P 7/065 410/119 |
| 2004/0040114 A1 | * | 3/2004 | Takemoto | A47L 13/257 15/261 |

* cited by examiner

*Primary Examiner* — Stephen Gordon
(74) *Attorney, Agent, or Firm* — Albert W. Watkins

(57) ABSTRACT

A dunnage bag hanger apparatus includes a dunnage bag hanger and a handle mounted applicator block operative to support and affix the dunnage bag hanger. The dunnage bag hanger is fabricated from three distinct and separate parts: a generally planar support substrate and two release papers covering adhesive patches or regions on the support substrate. The support substrate in one embodiment is a sheet that is further divided into two contact members separated by a resilient coupler. Each contact member preferably has a contact body, a hanging loop distal to the resilient coupler, and an adhesive coating. The two adhesive couplings are preferably on opposite sides of the support substrate sheet.

6 Claims, 4 Drawing Sheets

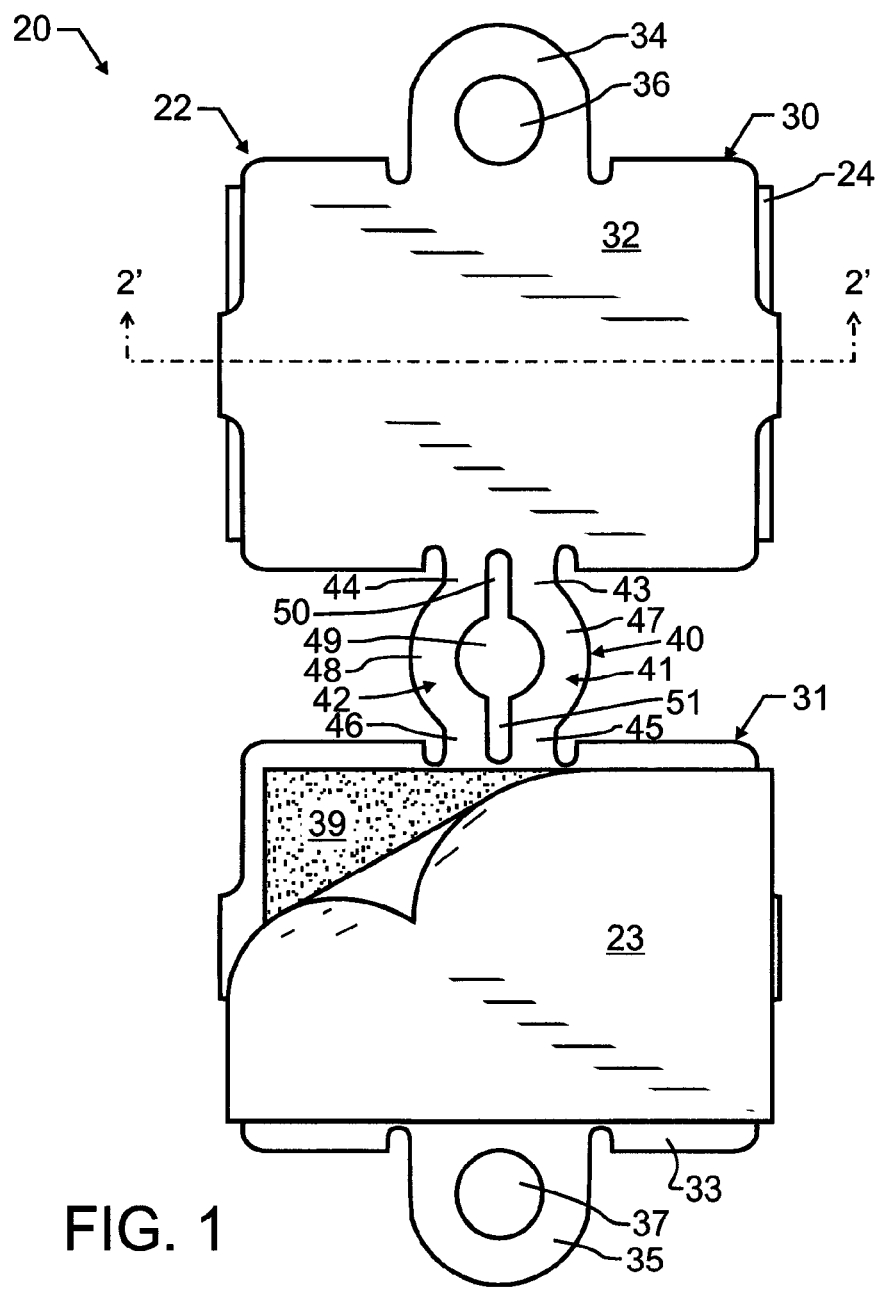
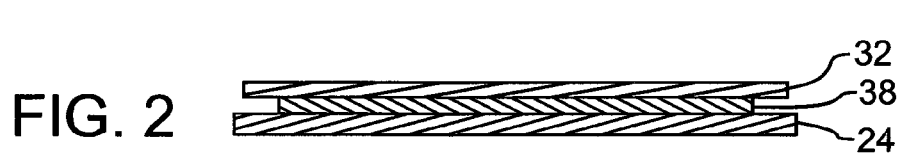
FIG. 1
FIG. 2

DUNNAGE BAG HANGER APPARATUS AND METHOD

CROSS REFERENCE TO RELATED APPLICATIONS

The present application is a Divisional of U.S. patent application Ser. No. 14/918,480 filed Oct. 20, 2015 and granted as U.S. Pat. No. 9,545,872 on Jan. 17, 2017, which is a Divisional of U.S. patent application Ser. No. 14/534,164 granted as U.S. Pat. No. 9,193,293 on Nov. 24, 2015, which in turn claims the benefit under 35 U.S.C. 119(e) of U.S. provisional patent application Ser. No. 61/900,396 filed Nov. 5, 2013, each of like title and inventorship, the entire contents and teachings of each which are incorporated herein by reference.

BACKGROUND OF THE INVENTION

1. Field of the Invention

The present invention pertains generally to apparatus and methods operative to inhibit shifting of a load, and thereby assure the integrity of freight loaded on board a carrier vehicle or container while in transit. More particularly, the present invention pertains to an apparatus for rapidly, safely, and efficiently anchoring an inflatable load engaging member to either the load or the load carrier.

2. Description of the Related Art

Very diverse cargo, represented by all types of matter, size, and purpose is being moved about us at a dizzying pace. The logistics of this production and transport is equally as complex and challenging, and has led to the expenditure of billions of dollars developing and implementing several important technologies. Among these are just-in-time (JIT) delivery which can apply to both production and transport; transportation vehicle tracking using Global Positioning System (GPS) locators, cellular tower triangulation, and other position detection apparatus; and even discrete device, package or container tracking and monitoring. In summary, enormous investment has been made in knowing exactly where a particular cargo shipment is physically located during transport.

When effectively executed, these technologies can reduce the need for warehouse space, reduce the likelihood of product spoilage or expiration, and improve inventory turnover, all which are very important in controlling costs, improving reliability of delivery, and increasing manufacturing flexibility. Nevertheless, and as may be apparent, these technologies also rely entirely upon the safe transport of the cargo. A perfectly timed delivery is useless, and can instead be extremely costly, if the cargo itself is damaged or destroyed during transit.

This diverse cargo may be loaded in equally as diverse carrier vehicles or containers. A cargo area might, for exemplary purposes only and not solely limiting thereto, be defined by a cargo container such as a rail car, an airplane cargo hold, a semi trailer, or an intermodal container, each of which will be of different size and shape. When filling these cargo containers, the cargo will rarely exactly fit within. In addition, there are many times where the cargo may comprise large, irregular, and relatively unprotected items, or be shipped in a cargo container which may also contain other diverse cargo. Whether due to an inexact fit between the cargo container and cargo, or as a result of irregular cargo, there will almost always be undesirable empty spaces within the cargo container. These empty spaces may in turn may lead to undesirable load shifting of the cargo within the cargo container during transport. Such load shifting, particularly when it occurs suddenly, may lead to substantial damage both to the cargo and to the cargo container.

The risk of harm or damage to the cargo is governed in part by the cargo itself, which can be either fragile or durable; in part by the spaces or voids within the cargo container; and also in part by any additional surroundings or packing that may provide containment of the cargo. In other words, if one object is free to move and collide with another object within a cargo container, this collision certainly increases the risk of harm or damage. Alternatively, if an object is surrounded by a soft and cushioning divider, then the risk of harm or damage may be substantially reduced.

Particularly where the cargo may comprise large and relatively unprotected items, at least a minimal amount of isolation and protection can be highly beneficial. In such cases, a load divider is preferred, to isolate objects from each other. In addition, filling voids in a cargo container will also help to secure and stabilize cargo. For these and other applications, previous artisans have devised dunnage bags of various sorts that are readily inflated and which can be used for one or more of the aforementioned or other known applications. Dunnage bags are inflatable bags commonly used in the transportation industry to fill empty spaces within a cargo area. They literally provide an air cushion around cargo, and can be inflated to fill up most any void within a cargo container. In the event of a sudden force applied to the cargo container, such as a bump in the road or a rough handling of the cargo container, the dunnage bag will merely compress between adjacent objects, increasing the pressure within the bag and absorbing the energy that would otherwise lead to damaged cargo.

Unfortunately, these dunnage bags are generally quite large and awkward to handle, and even more difficult to place and hold during inflation. Once again, this is especially true where the spaces to be filled and the dunnage bags placed within these spaces are both relatively large. Common cargo containers are commonly much taller than an ordinary person. For exemplary purposes, intermodal containers and semi-trailers will typically range from 8 to 9.5 feet tall, and hicube boxcars have typical internal heights approaching 13 feet. In order to reach these heights and properly place the dunnage bags, workers will typically climb on ladders and attempt to hold the bag and additionally hold an inflation source, all while guiding and placing the bag and while maintaining footing on the ladder. As can be appreciated, this approach is quite dangerous, particularly in cold or wet conditions, and requires many trips up and down the ladder to place the dunnage bags. Furthermore, the worker can only set the ladder on open flooring, meaning he may have to reach over or around the cargo, which can lead to slip and fall injuries. The worker may not even be able to reach into smaller voids, leaving these unprotected. Depending upon how full the cargo container may be, there may not be any open flooring upon which to set the ladder.

Another issue arises with some taller cargo containers such as typical rail cars. OSHA standards require a person who is 6 feet or more above the ground or floor to be tied off before conducting any tasks. Typical rail cars are commonly approximately 13 feet in internal height. This means that an ordinary person will in most cases need to climb above the six foot OSHA threshold in order to be able to reach a hanging location within the rail car. The challenge in the case of placing prior art dunnage bags is that there is no place for a worker to tie off to within most rail cars. This means that the worker is almost certainly in violation of OSHA requirements, creating undesirable legal exposure.

Even if there is a place to tie off, the time required to obtain and place the ladder, climb the ladder, tie off, place the dunnage bag, release the safety tie, climb back down the ladder, and then store the ladder is both substantial and an undesirable hindrance.

In the prior art, some artisans have designed hangers and slides or other mechanical apparatus which are semi-permanently or permanently attached. Exemplary U.S. patents, the teachings and contents which are incorporated herein by reference, include: U.S. Pat. No. 3,442,402 by Baxter, entitled "Dunnage service"; U.S. Pat. No. 6,253,806 by Sperry et al, entitled "Inflatable packing material and inflation system"; and U.S. Pat. No. 7,918,167 by Tanielian et al, entitled "Extremely rapid reversible barrier and formation method". While solving some problems, these add substantial cost to the cargo container, limit the flexibility of placement of dunnage bags, and restrict future use of the cargo container. As may be apparent, subdividing a container using dunnage bag curtains or walls is beneficial, but certainly not as flexible in use or application as freely placed bags. Instead, the subdivided cargo space is still subject to the issues of the larger space, namely whether the cargo fits well into the subdivided space and whether there is irregular shaped cargo.

Several other artisans have designed dunnage bags that may be adhesively attached to either the cargo container or load. Exemplary U.S. patents, the teachings and contents which are incorporated herein by reference, include: U.S. Pat. No. 4,145,973 by Baxter, entitled "Dunnage bag with attachment means"; U.S. Pat. No. 5,263,801 by Keenan et al, entitled "Dual bladder airbag"; and U.S. Pat. No. 5,431,515 by Sansone et al, entitled "Dual bladder airbag". To allow these bags to be placed first, and then inflated, adhesive patches or strips provided in these prior art bags are located adjacent to the top of the bag. This allows the bag to be hung limply in an uninflated state from the adhesive area, and then the bag may be inflated to fill the space. Once the bag is inflated, it will typically be securely held in place due to surface contact and friction with surrounding objects and surfaces.

However, this means that the bags must be adhered at or near to the top of the cargo container. Once again, this means the worker will need to reach to near the top of the container, which may for exemplary purposes range from 8 to 13 feet above the floor. This means that this adhesive attachment still suffers from many of the limitations of the prior art, being time consuming and undesirably dangerous. As also noted above, the worker may not even be able to reach into smaller voids, leaving these unprotected.

The teachings and contents of two additional patents are incorporated by reference: U.S. Pat. No. 3,890,188 by Sams, entitled "Label dispensing and applying apparatus"; and U.S. Pat. No. 8,485,580 by Ackerstein Klein, entitled "Apparatus for protecting a child's head". In addition to the aforementioned patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is, in combination, a dunnage bag, a dunnage bag hanger, and an application block. The dunnage bag has an outer substantially air-tight envelope defining an interior volume, and a valve for selectively admitting and releasing gas from the interior volume. The dunnage bag hanger has a support substrate, at least one contact member, at least one hanging loop, and an affixing surface affixed to the dunnage bag. The application block has a body, handle receiver affixed to the body, a dunnage bag hanger engaging member affixed to the body and adaptive to operatively engage with and retain the at least one hanging loop, and an applicator pad defining at least one surface of the application block body and adapted to operatively engage with and resiliently apply pressure to the at least one dunnage bag hanger contact member.

In a second manifestation, the invention is a dunnage bag hanger having a support substrate, at least one contact member, at least one hanging loop, and an affixing surface.

In a third manifestation, the invention is a dunnage bag hanger application block having a body, a handle receiver affixed to the body, a hanging member affixed to the body and adapted to operatively engage with and retain a dunnage bag hanger hanging loop, and an applicator pad defining at least one surface of the application block body and adapted to operatively engage with and resiliently apply pressure to a dunnage bag hanger contact member.

OBJECTS OF THE INVENTION

Exemplary embodiments of the present invention solve inadequacies of the prior art by providing a dunnage bag hanger and a pole or handle mounted application block. The dunnage bag hanger may be attached directly and quickly to cargo or cargo containers, and also to dunnage bags.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a safe ground or floor-level method of affixing a dunnage bag to cargo or a cargo container. A second object of the invention is to enable the dunnage bag attachment operation to be carried out quickly and efficiently. Another object of the present invention is to provide an easily manufactured, compactly stored or carried about, and low cost dunnage bag hanger that consists of a minimum of parts. A further object of the invention is to enable the dunnage bag hanger to be both disposable and recyclable. Yet another object of the present invention is to provide a dunnage bag hanger that may be used in all climates reliably and effectively. An additional object of the invention is to allow the application block to easily reach into tight spaces or to high elevations at a distance, quickly and efficiently, and without the need for ladders. A further object of the invention is to provide nominal flexure and conformity in the dunnage bag hanger and application block, permitting the invention to work effectively even on irregular surfaces.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIG. 1 illustrates a preferred embodiment dunnage bag hanger designed in accord with the teachings of the present invention from top plan view.

FIG. 2 illustrates the preferred embodiment dunnage bag hanger of FIG. 1 from a side sectional view taken along section line 2'.

DESCRIPTION OF THE PREFERRED EMBODIMENT

Manifested in the preferred embodiment dunnage bag hanger apparatus 10, the present invention provides a safe and rapid way to place dunnage bags within a cargo container. A preferred embodiment dunnage bag hanger 20 that may be used as a part of preferred embodiment dunnage bag hanger apparatus 10 is illustrated for exemplary purposes in FIGS. 1 and 2. Dunnage bag hanger 20 is fabricated from three distinct and separate parts: support substrate 22 of generally laminar or sheet configuration; and two release papers 23, 24.

Figure 7:
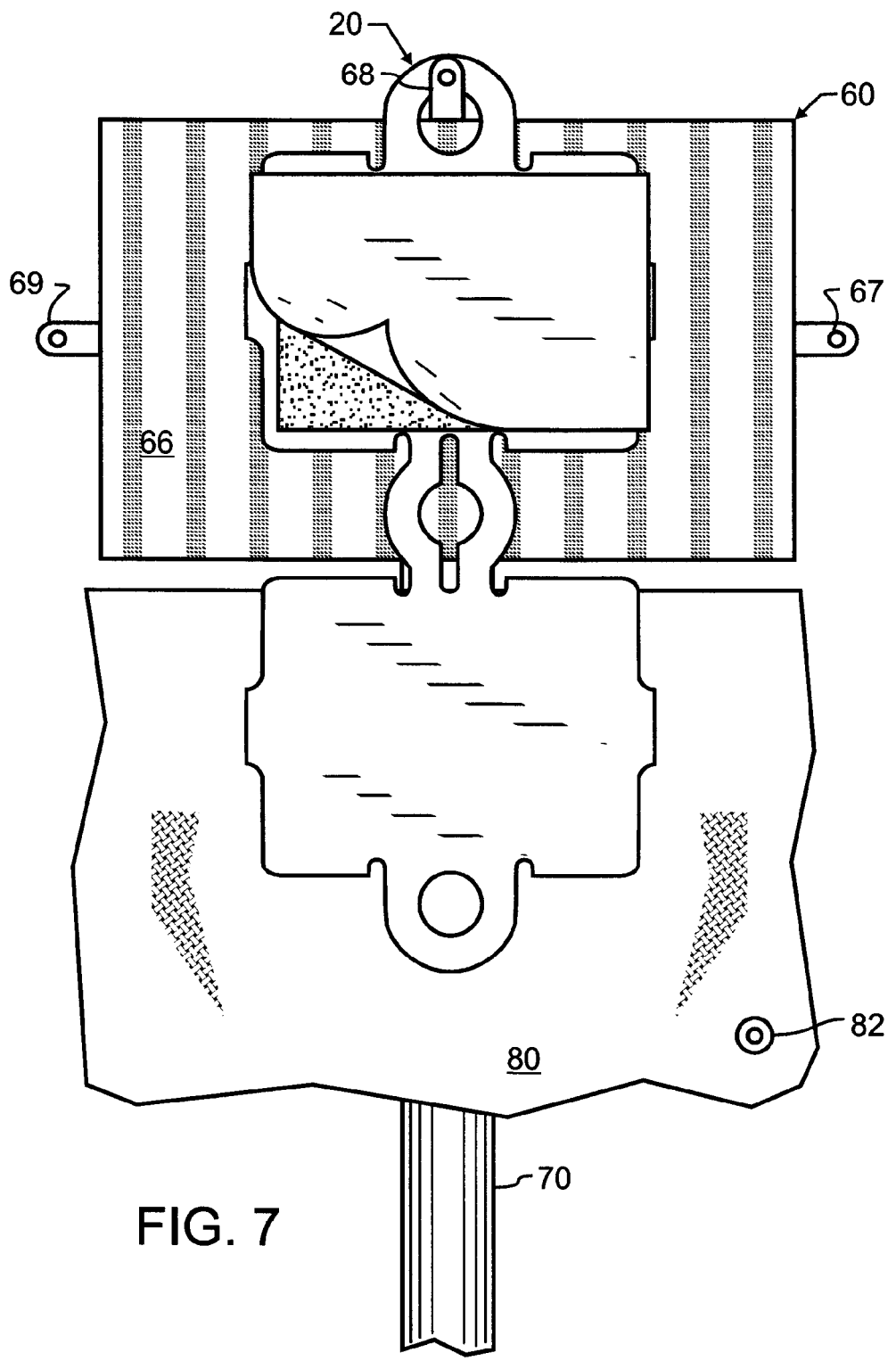
FIG. 7 illustrates a preferred embodiment dunnage bag hanger apparatus affixed to a dunnage bag and including an alternative embodiment dunnage bag hanger and handle from top plan view.

Most preferably, support substrate 22 is formed from a sheet of plastic or other resilient material which will offer sufficient structural rigidity and strength to support the anticipated forces required to support a dunnage bag such as dunnage bag 80 illustrated in FIG. 7, while also allowing the smaller legs to flex and bend as required while hanging a dunnage bag. In an exemplary embodiment, the invention may be formed from High Density PolyEthylene (HDPE), polypropylene, or other similar materials that offer excellent flexibility, good temperature tolerance, and ready availability. Various fillers and additives may also be provided as is known in the field of materials science. For exemplary purpose only, and not limiting the present invention solely thereto, fillers such as glass or other fibers may be added to increase strength, crack resistance, and abrasion resistance. Likewise, various additives such as colorants, plasticizers, ultra-violet inhibitors and the like may also be incorporated into the material as desired. While plastics or similar resilient materials are preferred, it will be recognized that there are a plethora of similar materials including metals, resins and plastics, technical ceramics or cementitious materials, and even combinations, laminates or composites of the above. Most importantly, the material used will provide both flexibility and sufficient strength through the entire necessary temperature range to operate and function successfully.

Support substrate 22 defines a pair of contact members 30, 31 that are spaced from each other by a resilient coupler 40. Each of the first and second contact members 30, 31, which may be of any suitable geometry, will preferably have an adhesive coating or layer 38, 39, respectively, applied upon major surfaces of support substrate 22. Preferably, adhesive coating 38 will be applied to contact body 32 upon a first major surface of support substrate 22, while adhesive coating 39 will be applied to contact body 33 upon a second major surface opposed to the first major surface. The adhesive coatings 38, 39 will preferably be designed to engage or affix to a cargo container, to cargo that might be carried within the container, or to a dunnage bag. Preferably, first contact member 30 with adhesive coating 38 may be affixed to one support surface, such as to the cargo or cargo container. A second contact member 31 with adhesive coating 39 may then be affixed to the dunnage bag. As may be apparent, it does not matter which one of first contact member 30 or second contact member 31 is affixed to the dunnage bag, but the other one of first contact member 30 or second contact member 31 will then be affixed to the cargo or cargo container.

While an adhesive coating is described, it will be understood that this may take many forms, and that the function is to hold or bind support substrate 22 to cargo, a cargo container, other suitable fixture, or a dunnage bag. Consequently, adhesive coatings 38, 39 may alternatively be any affixing member, including but not limited to mechanical apparatus such as hook-and-loop apparatus, magnetic materials such as polymer-bound magnets, electrostatic apparatus, or chemical apparatus such as two-part materials that fuse, react, vulcanize or otherwise chemically combine or change.

In a most preferred embodiment, adhesive coatings 38, 39 will further be operative through as wide a range of temperatures as may be encountered. For rail cars, cargo containers, and semi trailers, this may range from temperatures well above 120 degrees Fahrenheit to temperatures below minus twenty degrees Fahrenheit. The adhesive may be applied in a liquid form or may be applied as a film or double-sided tape, or may be formed through special chemistry directly within the support substrate material, such as through incomplete vulcanization or the formation of separate layers within the support substrate.

A particularly preferred adhesive coating is formed from tape with suitable adhesive that may further and optionally incorporate reinforcing fibers or strands, though as already described, the invention is not solely limited thereto. In preferred embodiment dunnage bag hanger 20 illustrated in FIGS. 1 and 2, adhesive coatings 38, 39 are preferably be covered by release paper 24, 23, respectively, or other suitable coverings, or the adhesive coatings may otherwise be activated in another way appropriate to installation such as through chemical or thermal activation. Where the adhesive is only appropriate for a single use, such as in the preferred embodiment dunnage bag hanger 20, then dunnage bag hanger 20 will only be used once and then disposed of appropriately.

In preferred embodiment dunnage bag hanger 20 illustrated in FIGS. 1 and 2, resilient coupler 40 has a pair of coupling legs 41, 42, each which have a first linear parallel segment 43, 44, respectively, and a second linear parallel segment 45, 46 respectively. The first and second linear parallel segments are separated by respective gentle arcuate sections 47, 48. Coupling legs 41, 42 together define a central coupler opening 49 having a first coupler opening extension 50 and a second coupler opening extension 51. The openings 49-51 together form a generally button-hole shaped opening between coupling legs 41, 42. While other shapes are also contemplated herein in alternative embodiments ranging from simple parallel legs or even a single linear leg, the pair of legs with the geometries as shown permit enormous flexibility in the legs with a desired amount of resilience, and without weakening or harming the support substrate material from which they are formed. Consequently, the geometry of resilient coupler 40 as illustrated is most preferred.

At distal ends of support substrate are hanging loops 34, 35 defining holes 36, 37 respectively. While in the preferred embodiment dunnage bag hanger 20 these loops are formed integrally with support substrate 22, it will be understood that these may be separate components. For exemplary and non-limiting purposes only, these might be formed by affixing separate strands such as twisted or braided wire to support substrate 22.

As described herein above, in use preferred embodiment dunnage bag hanger 20 is applied by applying one of contact members 30, 31 coating to the dunnage bag, and the other one of contact members 30, 31 to the container, cargo or other suitable support. By using a slightly compliant or flexible support substrate material, preferred embodiment dunnage bag hanger 20 may also be applied to non-flat surfaces such as those that gently curve.

Figure 3:
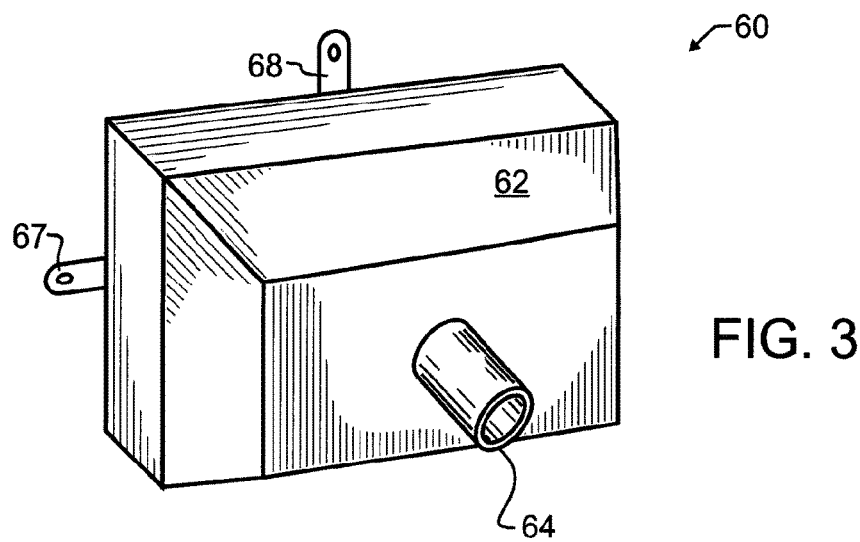
FIGS. 3-5 illustrate a preferred embodiment application block from projected, top and side views, respectively.
Figure 4:
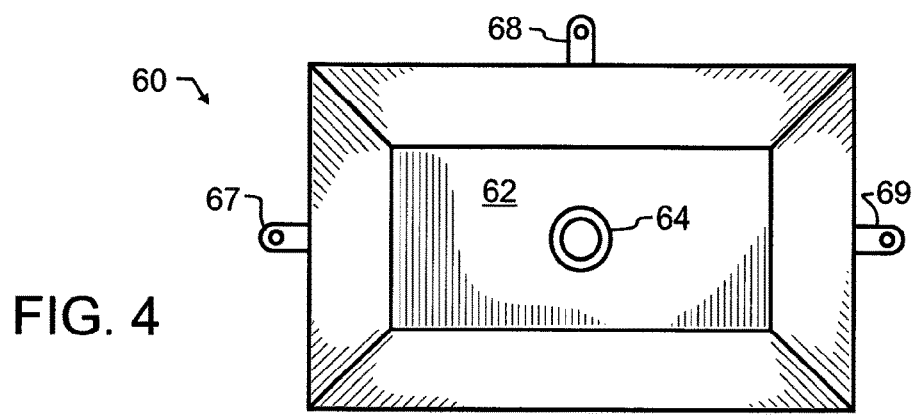
Figure 5:
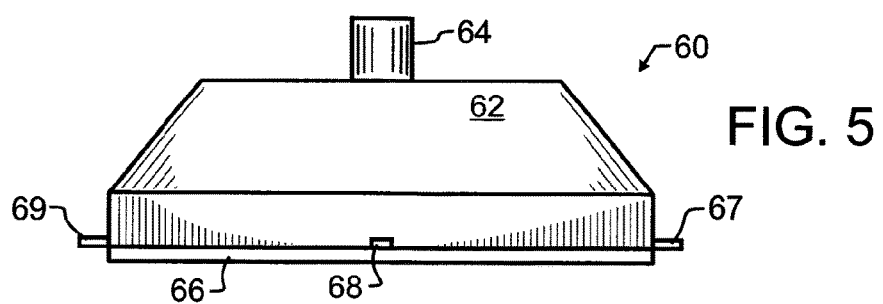

FIGS. 3-5 illustrate a preferred embodiment application block 60 that facilitates the hanging of preferred embodiment dunnage bag hanger 20. Application block 60 includes a body 62 which may be solid or hollow, and which may be fabricated from any suitable material such as but not limited to wood, metal or plastic. A handle receiver 64 such as may be used to receive a threaded broomstick handle 70 or the like is provided to allow application block 60 to be coupled to a suitable prior art handle, such as a broom stick, painting pole, extension arm, or other suitable apparatus. Handle receiver 64 may be threaded, frictionally fit, compressively fit, or otherwise locking as is known in the mechanical arts, and may comprise a male coupling component, female coupling component, or any other type of suitable coupling. Various swivel, locking and adjustable angle couplings may further be provided between handle 70 and application block 60 as desired. A pad 66 of resilient material such as foam or, in the preferred embodiment, carpet forms a work face of application block 60. Pad 66 will preferably deform when pressed against a contact member to ensure even application of forces or pressures upon the contact member, again regardless of whether a mounting surface is even or not.

Most preferably, application block 60 will also have at least one and in the preferred embodiment three hanging hooks 67-69 that are operative with hanging loops 34, 35 of preferred embodiment dunnage bag hanger 20 to allow a person to lift and hang dunnage bag hanger 20. While hanging hooks 67-69 and complimentary hanging loops 34, 35 are exemplary in the preferred embodiment, it will be understood that any apparatus that also reasonably secure and temporary or selectively removable engagement between application block 60 and dunnage bag hanger 20 will be considered to be incorporated herein as an alternative embodiment. For example, and not solely limiting the present invention thereto, various clips, suction devices, magnetic couplers and other apparatus may also be applied hereto.

For the following discussion, it will be presumed that contact member 30 is being affixed to a cargo container, and all references will be to components that form a part of contact member 30. However, it will be understood that the discussion is equally applicable to the equivalent components of contact member 31 and that contact member 31 could instead be attached to a cargo container.

In a first step, a person will remove release paper 23 from contact member 31, and a dunnage bag 80 illustrated in FIG. 7 may then be affixed directly to adhesive 39. The geometry of the hanging hooks 67-69 is not critical, and may take any suitable form. However, in the next step on of these hanging hooks 67-69 will preferably slide through hole 36 and catch hanging loop 34, so that dunnage bag hanger 20 may be lifted and moved about while both hanger 20 and the dunnage bag 80 are suspended from one of hanging hooks 67-69. Most preferably, when dunnage bag hanger 20 is suspended from one of hanging hooks 67-69, the non-adhesive major surface of contact member 30 will be immediately adjacent to pad 66. This exposes adhesive coating 38 when release paper 24 is removed therefrom. Then application block 60 may be raised to a desirable attachment location, and pressure can be applied through the handle, causing pad 66 to press against contact member 30. Once again, by using a material that is slightly flexible in the fabrication of support substrate 22 and by using a slightly flexible or deformable pad 66, the present invention will conform to minor irregularities in a surface and still securely affix thereto. As may be apparent then, a person need only remove one release paper and attach dunnage bag 80, then slide the opposite contact member hanging loop onto handle 70, remove the second release paper, and finally affix dunnage bag hanger 20 into the cargo or cargo container. The dunnage bag 80 may then be inflated through an inflation valve 82 or the like as is known in the art. This is all done at ground level, without the need to retrieve or climb a ladder.

The provision of three hanging hooks 67, 68, 69, each perpendicular to the adjacent hooks, allows application block 60 to be used to not only hang a dunnage bag hanger 20 using hanging hook 68 and holding a pole or handle vertically, referenced here as in the 12 o'clock position. FIG. 7 illustrates dunnage bag hanger 20 suspended from hanging hook 68, viewed from the pad 66 side of application block 60 but without a dunnage back suspended therefrom. Dunnage bag hanger 20 may also be hung using hanging hook 67 and holding a pole or handle horizontally and extending to the operator's right, referenced here as in the 3 o'clock position, or to hang a dunnage bag hanger 20 using hanging hook 69 and holding a pole or handle horizontally and extending to the operator's left, referenced here as in the 9 o'clock position. As may be apparent, at least one hanging hook needs to be provided, but any number may be provided so long as they do not interfere with one passing through a hanging loop 34, 35.

Various embodiments of dunnage bag hanger apparatus designed in accord with the present invention have been illustrated in the various figures. The embodiments are distinguished by the hundreds digit, and various components within each embodiment designated by the ones and tens digits. However, many of the components are alike or similar between embodiments, so numbering of the ones and tens digits have been maintained wherever possible, such that identical, like or similar functions may more readily be identified between the embodiments. If not otherwise expressed, those skilled in the art will readily recognize the similarities and understand that in many cases like numbered ones and tens digit components may be substituted from one embodiment to another in accord with the present teachings, except where such substitution would otherwise destroy operation of the embodiment. Consequently, those skilled in the art will readily determine the function and operation of many of the components illustrated herein without unnecessary additional description.

Figure 6:
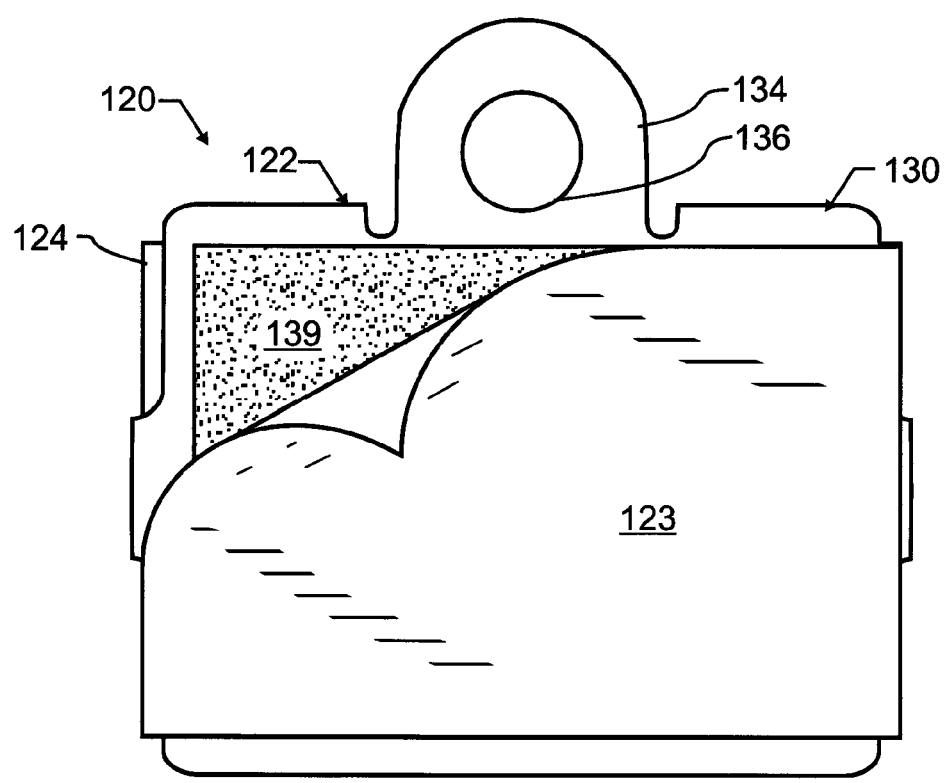
FIG. 6 illustrates an alternative embodiment dunnage bag hanger from top plan view.

FIG. 6 illustrates an alternative embodiment dunnage bag hanger 120 which has many of the same features as those found in the preferred embodiment. However, rather than having two separate contact members 30, 31 interconnected by resilient legs, a single contact member 130 has adhesive coatings 138, 139 placed on the opposed major surfaces. This hanger 120 is less preferred, since the dunnage bag must flex and move to contact the cargo container surface, regardless of whether the alternative embodiment dunnage bag hanger 120 is applied first to the cargo container or first to the dunnage bag.

From the foregoing figures and description, several additional features and options become more apparent. First of all, as noted herein above, the preferred or alternative embodiment dunnage bag hangers and application block may be manufactured from a variety of materials. The specific material used may vary, though it is preferable that all materials are sufficiently tough and durable to not fracture, even when significant forces are applied thereto. Furthermore, where dunnage bag hangers 20, 120 are disposable, it will be understood that the materials may be selected to enable recycling, such as but not limited to the use of HDPE and polypropylene described herein above.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

We claim:

1. In combination, a dunnage bag, a dunnage bag hanger and a dunnage bag hanger application block,
    said dunnage bag comprising:
        an outer substantially air-tight envelope defining an interior volume;
    said dunnage bag hanger comprising:
        a hanging loop and an adhesive fixing surface,
    said dunnage bag hanger application block comprising:
        a body;
        a handle receiver affixed to said body;
        a hanging member affixed to said body and adapted to operatively engage with and retain said dunnage bag hanger hanging loop; and
        an applicator pad defining at least one work face of said application block body and adapted to operatively engage with and resiliently apply pressure to said dunnage bag hanger adhesive fixing surface and thereby affix said dunnage bag hanger adhesive fixing surface to a dunnage bag support surface.

2. The combination dunnage bag, dunnage bag hanger and dunnage bag hanger application block of claim 1, wherein said hanging member further comprises at least one hook protruding from said body.

3. The combination dunnage bag, dunnage bag hanger and dunnage bag hanger application block of claim 2, wherein said work face comprises a generally planar surface terminating at a plurality of edges, and wherein said at least one hook further comprises a plurality of hooks, each one of said plurality of hooks protruding from a different edge of said work face generally planar surface.

4. The combination dunnage bag, dunnage bag hanger and dunnage bag hanger application block of claim 1, wherein said applicator pad further comprises a resilient material.

5. The combination dunnage bag, dunnage bag hanger and dunnage bag hanger application block of claim 4, wherein said applicator pad further comprises carpet.

6. The combination dunnage bag, dunnage bag hanger and dunnage bag hanger application block of claim 4, wherein said applicator pad further comprises foam.

\* \* \* \* \*